US009811577B2

(12) United States Patent
Martin et al.

(10) Patent No.: US 9,811,577 B2
(45) **Date of Patent: *Nov. 7, 2017**

(54) ASYNCHRONOUS DATA REPLICATION USING AN EXTERNAL BUFFER TABLE

(71) Applicant: International Business Machines Corporation, Armonk, NY (US)

(72) Inventors: Daniel Martin, Stuttgart (DE); Christopher R. G. O'Quinn, Mississauga (CA); James D. Spyker, Toronto (CA); Yongfeng Yao, Foster City, CA (US)

(73) Assignee: International Business Machines Corporation, Armonk, NY (US)

(*) Notice: Subject to any disclaimer, the term of this patent is extended or adjusted under 35 U.S.C. 154(b) by 96 days.

This patent is subject to a terminal disclaimer.

(21) Appl. No.: 14/728,245

(22) Filed: Jun. 2, 2015

(65) Prior Publication Data

US 2016/0179919 A1 Jun. 23, 2016

Related U.S. Application Data

(63) Continuation of application No. 14/574,845, filed on Dec. 18, 2014.

(51) Int. Cl.
*G06F 17/30* (2006.01)

(52) U.S. Cl.
CPC .. *G06F 17/30578* (2013.01); *G06F 17/30389* (2013.01); *G06F 17/30477* (2013.01); *G06F 17/30563* (2013.01); *G06F 17/30864* (2013.01)

(58) Field of Classification Search
CPC ......... G06F 17/30554; G06F 17/30867; G06F 17/30477; G06F 17/30563; G06F 17/30864
See application file for complete search history.

(56) References Cited

U.S. PATENT DOCUMENTS 5,995,980 A * 11/1999 Olson .............. G06F 17/30578
7,024,483 B2 4/2006 Dinker et al.
7,035,858 B2 4/2006 Dinker et al.
7,139,925 B2 11/2006 Dinker et al.
(Continued)

FOREIGN PATENT DOCUMENTS

JP 2005056297 A 3/2005

OTHER PUBLICATIONS

Francisco, Phil, "The Netezza Data Appliance Architecture: A Platform for High Performance Data Warehousing and Analytics", IBM Redbooks, pp. 1-14, This document, REDP-4725-00, was created or updated on Jun. 20, 2011, © Copyright IBM Corp. 2011, All rights reserved.

(Continued)

*Primary Examiner* — Cam-Y Truong
(74) *Attorney, Agent, or Firm* — Erik K. Johnson

(57) ABSTRACT

Embodiments of the present invention provide, systems, methods, and computer program products for asynchronously replicating data from source tables of a source computer system to target tables of a target computer system. Embodiments of the present invention implement an external buffer table (EBT) from which changed data statements can be selectively applied to target tables, which can reduce the number of statements applied to the target tables of the target computer system.

10 Claims, 14 Drawing Sheets

700

START
SELECT EBT ENTRIES HAVING IDENTICAL TARGET TABLE NAMES 702
SORT SELECTED EBT ENTRIES BY OPERATION 704
APPLY CHANGED DATA DELETE STATEMENTS 706
APPLY CHANGED DATA INSERT STATEMENTS 708
ADDITIONAL EBT ENTRIES? 710 YES / NO
UPDATE BOOKMARK 712
END

(56) References Cited

U.S. PATENT DOCUMENTS

| | | | | |
|---|---|---|---|---|
| 7,240,054 | B2 | 7/2007 | Adiba et al. | |
| 8,032,885 | B2 | 10/2011 | Fish | |
| 8,239,389 | B2 | 8/2012 | Zagelow et al. | |
| 8,688,634 | B2 * | 4/2014 | Beyer | G06F 17/30286 707/616 |
| 2004/0236763 | A1 * | 11/2004 | Krishnamoorthy | G06F 17/30368 |
| 2005/0193040 | A1 * | 9/2005 | Adiba | G06F 17/30318 |
| 2012/0150829 | A1 * | 6/2012 | Bourbonnais | G06F 17/30578 707/703 |
| 2013/0073521 | A1 * | 3/2013 | Ng | G06F 17/30557 707/610 |
| 2014/0006963 | A1 | 1/2014 | Nandy et al. | |
| 2015/0032695 | A1 * | 1/2015 | Tran | G06F 17/30578 707/625 |
| 2016/0041996 | A1 * | 2/2016 | Prinz, III | G06F 17/30079 707/827 |

OTHER PUBLICATIONS

“Asynchronous Data Replication Using an External Buffer Table”, U.S. Appl. No. 14/574,845, filed Dec. 18, 2014, pp. 1-50.

IBM Appendix P, list of IBM patents or patent applications treated as related, pp. 1-2, dated Jun. 3, 2015.

* cited by examiner

| ENTRY NUMBER | DESTINATION TARGET TABLE | PSEUDO-CODE FOR CHANGED DATA STATEMENTS |
|---|---|---|
| 1 | TABLE_NAMES | DELETE from TABLE_NAMES WHERE 'KEYIMAGE'='1_NAMES' |
| 2 | TABLE_NAMES | INSERT into TABLE_NAMES ('1_NAMES', Adam Jones, 11/11/2014) |
| 3 | TABLE_SALARY | DELETE from TABLE_SALARY WHERE 'KEYIMAGE'='1_SALARY' |
| 4 | TABLE_SALARY | INSERT into TABLE_SALARY ('1_SALARY' $73,000, $81,000) |
| 5 | TABLE_SALARY | INSERT into TABLE_SALARY ('3_SALARY' $30,000, $51,000) |

FIG. 10

| ENTRY NUMBER | DESTINATION TARGET TABLE | KEY IMAGE |
|---|---|---|
| 1 | TABLE_NAMES | 'KEYIMAGE'=1_NAMES |
| 3 | TABLE_SALARY | 'KEYIMAGE'=1_SALARY |

FIG. 11A

| DESTINATION TARGET TABLE | OPERATION | KEY IMAGE |
|---|---|---|
| TABLE_NAMES | 'D' | 'KEYIMAGE'=1_NAMES |
| TABLE_SALARY | 'D' | 'KEYIMAGE'=1_SALARY |

FIG. 11B

| ENTRY NUMBER | DESTINATION TARGET TABLE | KEY IMAGE | ROW IMAGE |
|---|---|---|---|
| 2 | TABLE_NAMES | 'KEYIMAGE'=1_NAMES | Adam Jones, 11/11/2014 |
| 4 | TABLE_SALARY | 'KEYIMAGE'=1_SALARY | $73,000, $81,000 |
| 5 | TABLE_SALARY | 'KEYIMAGE'=3_SALARY | $50,000, $71,000 |

FIG. 12A

| TABLE NAME | OPERATION | KEY IMAGE | ROW IMAGE |
|---|---|---|---|
| TABLE_NAMES | 'I' | 1_NAMES | Adam Jones, 11/11/2014 |
| TABLE_SALARY | 'I' | 1_SALARY | $73,000, $81,000 |
| TABLE_SALARY | 'I' | 3_SALARY | $50,000, $71,000 |

FIG. 12B

| TABLE NAME | OPERATION | KEY IMAGE | ROW IMAGE |
|---|---|---|---|
| TABLE_NAMES | 'I' | 1_NAMES | John Doe, 10/10/2014 |

FIG. 13A

| TABLE NAME | OPERATION | KEY IMAGE | ROW IMAGE |
|---|---|---|---|
| TABLE_NAMES | 'D' | 1_NAMES | John Doe, 10/10/2014 |
| TABLE_NAMES | 'I' | 1_NAMES | Adam Jones, 11/11/2014 |
| TABLE_SALARY | 'D' | 1_SALARY | $55,500, $62,00 |
| TABLE_SALARY | 'I' | 1_SALARY | $73,000, $81,000 |
| TABLE_SALARY | 'I' | 3_SALARY | $50,000, $71,000 |

FIG. 13B

ASYNCHRONOUS DATA REPLICATION USING AN EXTERNAL BUFFER TABLE

FIELD OF THE INVENTION

The present invention relates generally to the field of data management in computer systems, and more particularly to processing data during data replication from a source relational database to a target relational database.

BACKGROUND OF THE INVENTION

Asynchronous data replication between two types of databases involves processing source data changes from a source system and effectively applying (i.e., replicating) the source data changes to a target system. Typically asynchronous data replication involves committing source data changes in the source system and then replicating the source data changes to a target system. Subsequently, the data is replicated to target systems for scheduled intervals. For example, a financial institution may use a source system daily (e.g., an OLTP system) to rapidly execute financial information and update financial records. In this instance, the financial institution can asynchronously replicate data to a target system (e.g., an OLAP system) at the end of each month to aggregate and consolidate financial information and records.

A typical process for asynchronous data replication can be useful to replicate source data from an OLTP system to an OLAP system. The process may also require large computational overhead and a long apply time to replicate source data changes. For example, applying a single source data change can involve multiple statements to be applied to a single target table of a target system. Extrapolating this instance to many source data changes from multiple source systems to be applied to more than one target system can lead to a cost-ineffective and a lengthy duration of time for data replication.

SUMMARY

Embodiments of the present invention provide systems, methods, and program products for asynchronously replicating data. In one embodiment, a method is provided, the method comprising: receiving, by a target computer system, from a source computer system, one or more statements that describe data changes on one or more source tables of the source computer system to be replicated on one or more target tables of the target computer system; applying, by the target computer system, the one or more statements to an external buffer table of the target computer system; and selectively applying, by the target computer system, the one or more statements from the external buffer table to the one or more target tables to replicate the data changes on the one or more target tables.

In another embodiment, a method is provided, the method comprising: asynchronously replicating data changes made on one or more source tables of a source computer system to one or more target tables of a target computer system, wherein at least a portion of the data changes are applied an external buffer table of the target computer system and are selectively applied from the external buffer table to one or more target tables of the target computer system.

BRIEF DESCRIPTION OF THE DRAWINGS

FIG. 10 provides an example of a visual representation of an internal buffer of the capture agent, in accordance with an embodiment of the present invention;

FIGS. 11A and 11B provide examples of a newly created delete set and a formatted delete set, in accordance with an embodiment of the present invention;

FIGS. 12A and 12B provide examples of a newly created insert map and a formatted insert map, in accordance with an embodiment of the present invention;

FIGS. 13A and 13B provide examples of an external buffer table prior to applying changed data statements and the external buffer table subsequent to applying changed data statements, in accordance with an embodiment of the present invention.

DETAILED DESCRIPTION

Embodiments of the present invention provide systems, methods, and computer program products for asynchronously replicating data from a source system to a target system. Embodiments of the present invention implement an external buffer table (EBT) from which changed data statements can be selectively applied to target tables, which can help reduce computational demand and apply time that may otherwise result from applying all changed data statements to target tables.

Figure 1:
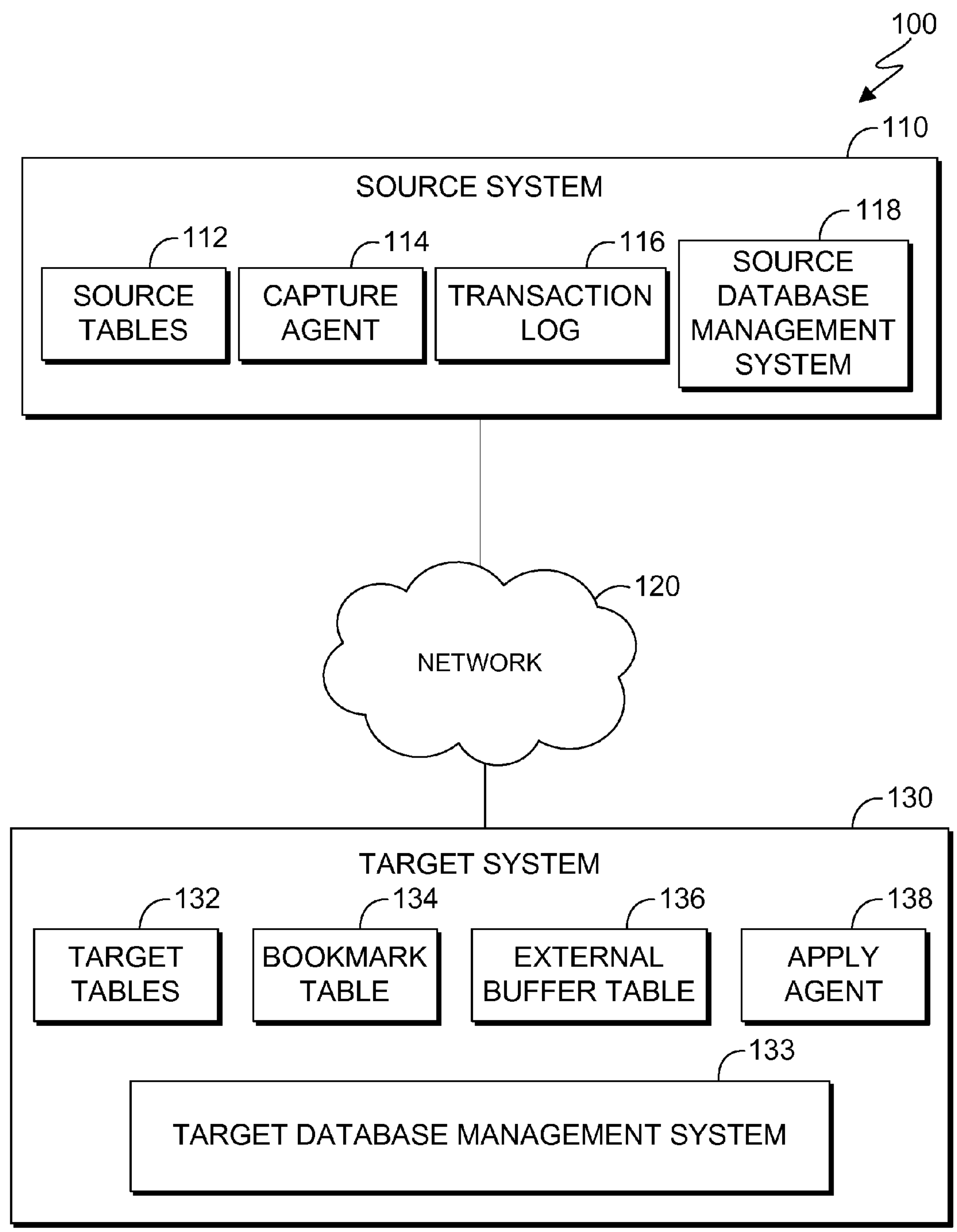
FIG. 1 is a block diagram of a computing environment, in accordance with an embodiment of the present invention.

FIG. 1 is a functional block diagram of computing environment 100, in accordance with an embodiment of the present invention. Computing environment 100 includes source system 110 and target system 130. Source system 110 and target system 130 can be desktop computers, laptop computers, specialized computer servers, or any other computer systems known in the art. In certain embodiments, source system 110 and target system 130 represent computer systems utilizing clustered computers and components to act as a single pool of seamless resources when accessed through network 120. For example, such embodiments may be used in data center, cloud computing, storage area network (SAN), and network attached storage (NAS) applications. In certain embodiments, source system 110 and target system 130 represent virtual machines. In general, source system 110 and target system 130 are representative of any electronic devices, or combination of electronic devices, capable of executing machine-readable program instructions, as described in greater detail with regard to FIG. 14.

Source system 110 is an information system that facilitates and manages transaction-oriented applications, such as an Online Transaction Processing system (OLTP system). Accordingly, source system 110 can support applications in database management that require high volume of throughput and are insert/update/delete intensive. In this embodiment, source system 110 includes source tables 112, capture agent 114, transaction log 116, and source database management system 118. Furthermore, source system 110 can receive source data changes, monitor source data changes, and transmit source data changes to target system 130.

Source tables 112, in which source system 110 stores source data, can be implemented using any suitable data structures and as part of any suitable storage architecture known in the art. For example, source tables 112 can be tables of one or more relational databases.

Capture agent 114 is a component of source system 110 that monitors source data changes, processes source data changes, and transmits source data changes to target system 130. In this embodiment, capture agent 114 includes a log reader and an internal buffer. The log reader can monitor source data changes in transaction log 116. Furthermore, capture agent 114 may process source data changes and subsequently transmit the source data changes from the internal buffer to target system 130.

Transaction log 116 is a log that contains entries of transactions for source tables 112. The term "transaction", as used herein, refers to read, write, delete, modify, or other operating statements performed on source tables 112. In this embodiment, entries of transaction log 116 can also contain error message handles, source system updates, log commit records (i.e., indications that operations in queue for particular transactions have been committed), or any other dynamic information pertinent to source tables 112. Accordingly, each entry in transaction log 116 can contain a different transaction for source tables 112. For example, a first entry of transaction log 116 may be a changed data DELETE statement, reflecting deletion of source data from source tables 112. A second entry of transaction log 116 may be a changed data INSERT statement, reflecting insertion of source data into source tables 112.

Source database management system 118 is a computer software application that handles retrieving, analyzing, and updating source data and source data changes on source tables 112.

Target system 130 is an information system that facilitates and manages consolidation of data from one or more databases (e.g., OLTP databases), such as an Online Analytical Processing (OLAP system). Accordingly, source system 110 can support applications in database management that require processing complex queries involving aggregations of source data. In this embodiment, target system 130 includes target tables 132, target database management system 133, bookmark table 134, external buffer table 136, and apply agent 138. Furthermore, target system 130 receives source data changes from source system 110, processes the source data changes, and selectively applies source data changes to target tables 132. Accordingly, target system 130 and components therein replicate source data to reflect source data changes in source tables 112 to target tables 132

Target tables 132, in which target system 130 stores replicated source data, can be implemented using any suitable data structures and as part of any suitable storage architecture known in the art. For example, target tables 132 can be tables of one or more relational databases.

Target database management system 133 is a computer software application that handles retrieving, analyzing, and updating source data and source data changes on target tables 132. In certain embodiments, target database management system 133 analyzes a query received by target system 130 to process the query and return a result to a user of target system 130. Target database management system 133 can transmit pertinent information for the analyzed query to apply agent 138 for subsequent processing.

Bookmark table 134 is a table that contains entries indicating changed data statements that have been successfully applied to target tables 132 and entries indicating changed data statements that have been successfully applied to external buffer table 136. In this embodiment, apply agent 138 stores entries (e.g., log positions of commit log records) in bookmark table 134. Such entries in bookmark table 134 contain information necessary to restart replication after a normal or unexpected termination of a replication process. For example, when restarting replication after an interruption, apply agent 138 may access entries in bookmark table 134 to identify source data changes that were most recently replicated to target system 130, and transmit this information to source system 110, such that source system 110 can transfer data to target system 130 that has not yet been successfully replicated to target system 130.

External buffer table 136 is a table in which target system 130 stores source data changes in source tables 112. In this embodiment, target system 130 and components therein, use external buffer table 136 to selectively apply source data changes to target tables 132 using bulk operations, which can reduce the number of statements applied to target tables 132. In another embodiment, changed data statements can also be directly applied to the target tables 132 without first being stored in external buffer table 136. Accordingly, using external buffer table 136 reduces the number of statements required to apply source data changes to target tables 132 for data replication, resulting in a reduced computational demand and apply time. External buffer table 136 can be implemented using any suitable data structures and as part of any suitable storage architecture known in the art. For example, external buffer table 136 can be tables of one or more relational databases. In certain embodiments, target system 130 receives a query, wherein target system 130 and components therein determine how to use external buffer table 136 to selectively apply source data changes to target tables 132 and process the query.

Apply agent 138 is a component of target system 130 that receives source data changes, processes source data changes, and applies source data changes to target tables 132. In this embodiment, apply agent 138 creates external buffer table 136 to store source data changes. Furthermore, apply agent 138 can store log positions in bookmark table 134 for commit log records that indicate successfully applied source data changes to target tables 132. In this embodiment, apply agent 138 includes an internal buffer. Apply agent 138 can create the internal buffer using an insert map and delete set, prior to creating external buffer table 136. Apply agent 138 can be implemented using any suitable software as part of any suitable database management system known in the art (e.g., target database management system 133).

Network 120 can be, for example, a local area network (LAN), a wide area network (WAN) such as the Internet, or a combination of the two, and include wired, wireless, or fiber optic connections. In general, network 120 can be any combination of connections and protocols that will support communications between source system 110 and target system 130, in accordance with a desired embodiment of the invention.

Figure 2:
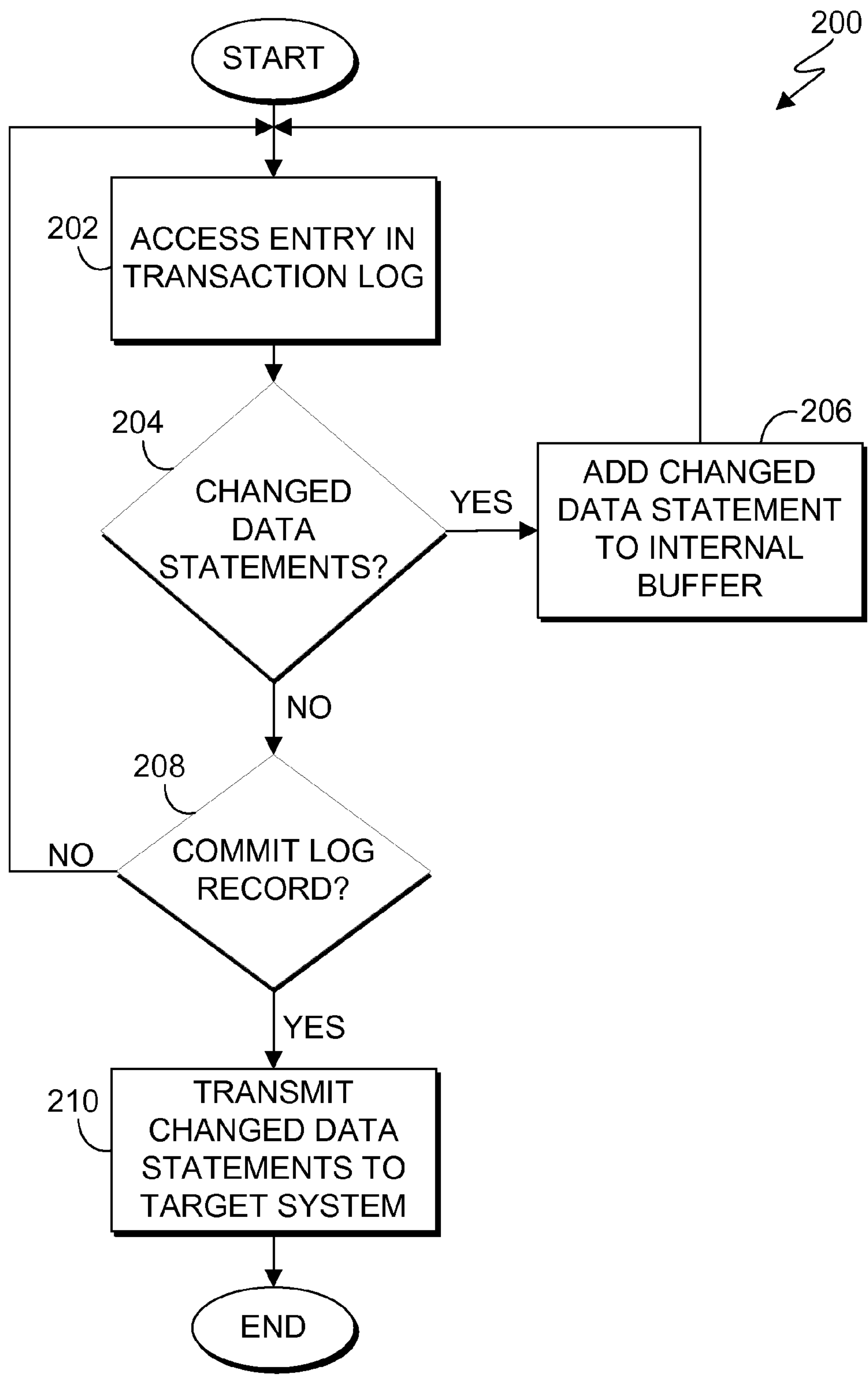
FIG. 2 is a flowchart illustrating operational steps for processing and transmitting source data changes to a target system, in accordance with an embodiment of the present invention.

FIG. 2 is a flowchart 200 illustrating operational steps for processing and transmitting source data changes to target system 130, in accordance with an embodiment of the present invention. In this embodiment, source data and source data changes on source tables 112 are generated by source system 110, provided by a user of source system 110, or received by another computer system (not depicted). For illustrative purposes, source data changes in source tables 112 are stored as changed data statements in transaction log 116. The changed data statements can be a changed data DELETE statement, a changed data INSERT statement, or a changed data UPDATE statement. In this embodiment, the changed data statements also can be correlated with names of target tables 132 for which changes in source data are to be replicated. Furthermore, the changed data statements also can be correlated with the source data that is inserted in source tables 112 or deleted from source tables 112. In another embodiment, entries in transaction log 116 contain source data changes, from which capture agent 114 creates changed data statements from each entry containing source data changes that comprises information to replicate the necessary source data change to target tables 132. In general, capture agent 114 uses changed data statements to process and transmit source data changes to target system 130.

In step 202, capture agent 114 accesses an entry in transaction log 116. In this embodiment, a log reader of capture agent 114 retrieves an entry of transaction log 116. Accordingly, the log reader of capture agent 114 uses the retrieved entry from the transaction log 116 to identify a type of transaction. As previously discussed, entries in transaction log 116 can be changed data statements. In other embodiments, entries in transaction log 116 are error message handles, source data changes, etc.

In step 204, capture agent 114 determines whether the accessed entry is a changed data statement. In this embodiment, the log reader analyzes the accessed entry to determine whether the accessed entry is a changed data INSERT statement, a changed data DELETE statement, or a changed data UPDATE statement (representing a changed data DELETE statement followed by a changed data INSERT statement).

If, in step 204, the log reader determines that the type of transaction in the retrieved entry is a changed data statement, then in step 206, capture agent 114 adds the changed data statement to an internal buffer of capture agent 114, after which the process continues with operational steps described in step 202 for accessing the next entry in transaction log 116. In this embodiment, the internal buffer of capture agent 114 contains entries of changed data statements in the order in which they were received by the log reader. Stated differently, the internal buffer of capture agent 114 preserves the order of source data changes by sequentially storing each changed data statement in the order in which they were received. In this embodiment, capture agent 114 accesses an entry in transaction log 116 to analyze a subsequent transaction after capture agent 114 adds the changed data statement to the internal buffer of capture agent 114.

If, in step 204, the log reader determines the type of transaction in the retrieved entry is not a changed data statement, then in step 208, capture agent 114 determines whether a commit log record is retrieved by the log reader. In this embodiment, the log reader analyzes the retrieved entry to determine the type of transaction in the entry. For example, the log reader may analyze the retrieved entry to identify a COMMIT statement which indicates a commit log record.

If, in step 208, the log reader determines that the type of transaction in the retrieved entry is a commit log record, then in step 210, capture agent 114 transmits changed data statements associated with the transaction referenced by the commit log record from the internal buffer of capture agent 114 to target system 130.

If, in step 208, the log reader determines that the type of transaction in the retrieved entry is not a commit log record, then capture agent 114 accesses a subsequent entry in transaction log 116 to analyze the transaction. Furthermore, source system 110 and components therein may continue to systematically retrieve, analyze, and process each entry in transaction log 116 until no entries remain or for a user specified interval. Accordingly, capture agent 114 transmits source data changes, in the form of changed data statements, to target system 130. In this embodiment, capture agent 114 can transmit changed data statements in batches or chunks to target system 130, wherein the chunks include all changed data statements since the preceding commit log record to the most recent commit log record. In other embodiments, capture agent 114 transmits changed data statements as they are received by capture agent 114. Accordingly, a user may specify the frequency of transmitting changed data statements to target system 130 in accordance with user preferences and computational thresholds. For example, a user may prefer to transmit changes in source data to target tables 132 as source data changes are made in source tables 112. In this instance, replicating individual changed data statements rather than chunks of changed data statements results in more frequently updated target tables 132, but may also result in high computational overhead.

Figure 3:
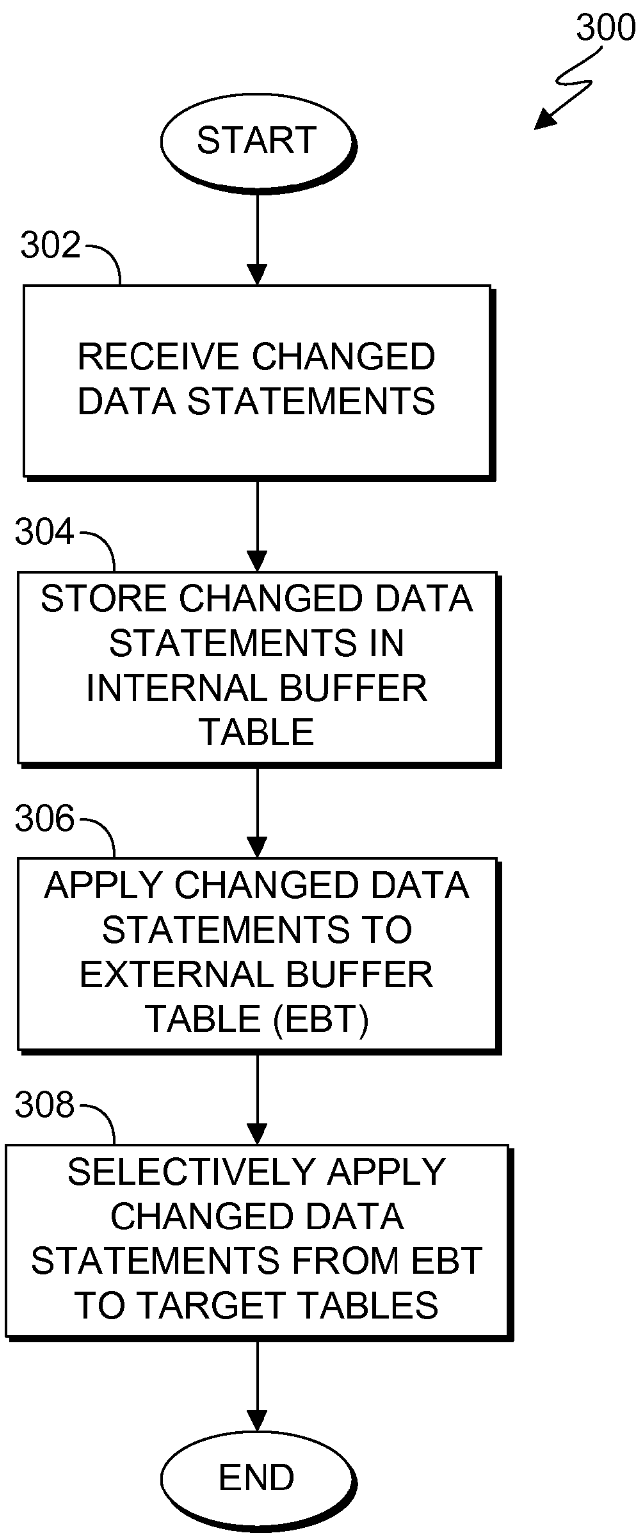
FIG. 3 is a flowchart illustrating operational steps for processing changes in source data and applying source data changes on the target system, in accordance with an embodiment of the present invention.

FIG. 3 is a flowchart 300 illustrating operational steps for processing changes in source data and applying changes in source data on target system 130, in accordance with an embodiment of the present invention.

In step 302, apply agent 138 receives changed data statements from source system 110. In this embodiment, apply agent 138 receives changed data statements transmitted by capture agent 114 via network 120. As previously discussed, apply agent 138 may receive changed data statements in chunks or receive changed data statements individually. In this embodiment, apply agent 138 receives changed data statements in chunks to reduce computational demand of target system 130, source system 110, and components therein. In another embodiment, apply agent 138 receives changed data statements individually as source data changes are made to source tables 112, reducing discrepancy between updated source data in target tables 132 and source data in source tables 112.

In step 304, apply agent 138 stores changed data statements in an internal buffer of apply agent 138. In this embodiment, apply agent 138 uses an internal buffer algorithm to create an insert map and delete set, as described in greater detail with regard to FIG. 4. Furthermore, the insert map and delete set provide formatted changed data statements for all source data changes in source tables 112 received by apply agent 138. Accordingly, embodiments of the present invention use the internal buffer to group together similar changed data statements, the application of which as a group is more efficient than the application of each changed data statement individually.

In step 306, apply agent 138 applies changed data statements to external buffer table 136. In this embodiment, apply agent 138 uses the insert map and delete set from step 304 to apply changed data statements in external buffer table 136, as described in greater detail with regard to FIG. 5. In embodiments of the present invention, all changed data statements received from apply agent 138 are applied to external buffer table 136 (i.e., a single table), regardless which target tables 132 are referenced in the changed data statements. Accordingly, by applying all changed data statements received from apply agent 138 to external buffer table 136, embodiments of the present invention can be used to reduce a computational demand that may otherwise result from applying the changed data statements to each of their individually referenced target tables 132.

In step 308, apply agent 138 selectively applies changed data statements from external buffer table 136 to target tables 132. In this embodiment, apply agent 138 processes entries in external buffer table 136 that contain changed data statements to apply to target tables 132 in a manner that reduces the number of statements processed by target system 130. Furthermore, apply agent 138 uses external buffer table 136 to selectively apply data to target tables 132 to reduce the apply time, which enables target system 130 to receive more updated source data, and reduces the computational load on target system 130. In certain embodiments, target database management system 133 receives and processes a query to return a result. Apply agent 138 can selectively apply changed data statements to target tables 132 in accordance with entries of target tables 132 and external buffer table 136 referenced by the query, as described in greater detail with regard to FIGS. 6-9.

Figure 4:
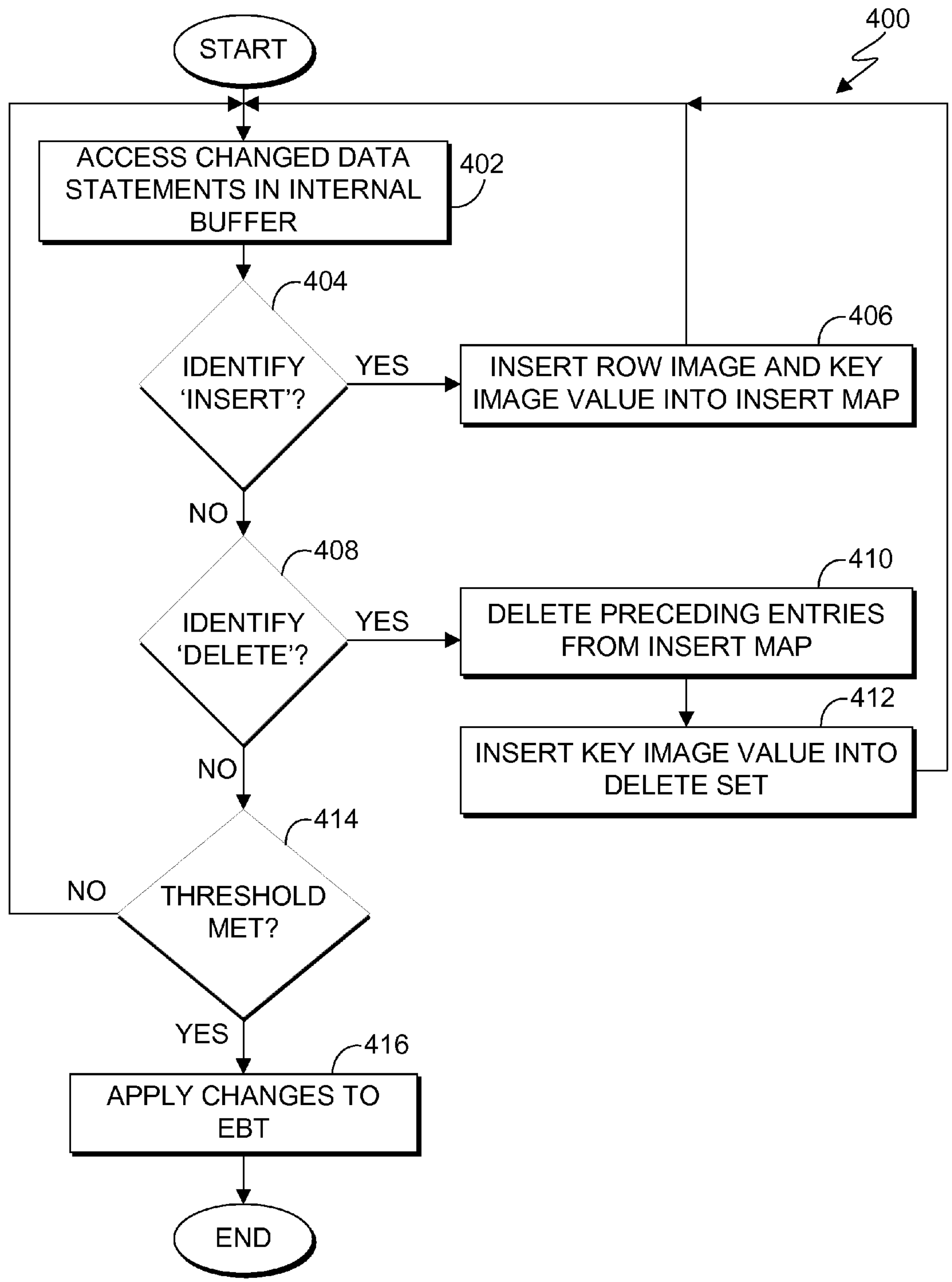
FIG. 4 is a flowchart illustrating operational steps for creating an insert map and a delete set, in accordance with an embodiment of the present invention.

FIG. 4 is a flowchart 400 illustrating operational steps for creating an insert map and a delete set, in accordance with an embodiment of the present invention. In this embodiment, apply agent 138 performs an algorithm to create an insert map and delete set. For example, the operational steps described in FIG. 4 can be performed at step 304 of FIG. 3. In this embodiment, an insert map comprises a plurality of entries describing data to be inserted into target tables 132. In this embodiment, each entry comprises a key image value (i.e., a unique row identifier), a name of the target table 132 to which the entry corresponds, and a row image containing data to be inserted into that particular target table 132. The term, 'row image' as used herein, refers to a mechanism that allows data from one or more columns of source tables 112, for a given row of source tables 112, to be represented in a single column of a row of external buffer table 136. In this embodiment, the row image comprises concatenated values for each column for a particular key image value, wherein each value is separated by a delimiter. For example, the row image for a changed data INSERT statement may be a concatenated string of values separated by the delimiter ";". In other embodiments, different mechanisms can be used to represent data from columns of source tables 112 in a single column of external buffer table 136.

In this embodiment, a delete set contains a plurality of entries describing data to be deleted from target tables 132. In this embodiment, each entry comprises a key image value and a name of the target table 132 to which the entry corresponds. Furthermore, the key image for a changed data DELETE statement is a value that indicates values in the row that are deleted from source tables 112.

In step 402, apply agent 138 accesses the internal buffer of apply agent 138. As previously discussed, entries in the internal buffer contain either a changed data INSERT statement or a changed data DELETE statement.

In step 404, apply agent 138 determines whether the accessed entry contains a changed data INSERT statement.

If, in step 404, apply agent 138 determines that the accessed entry contains a changed data INSERT statement, then, in step 406, apply agent 138 creates an insert map. Furthermore, apply agent 138 can insert a row image and key image value of the accessed entry into the insert map. In certain embodiments, apply agent 138 does not need to create an insert map if the accessed entry is not the first entry that contains a changed data INSERT statement. After which, embodiments of the present invention repeat operational steps described in step 402 of FIG. 4 to access a next entry in the internal buffer.

If, in step 404, apply agent 138 determines that the accessed entry does not contain a changed INSERT statement, then, in step 408, apply agent 138 determines whether the accessed entry contains a changed data DELETE statement.

If, in step 408, apply agent 138 determines that the accessed entry contains a changed data DELETE statement, then, in step 410, apply agent 138 deletes any entries in the insert map that chronologically precede the accessed entry and have the same named target table and key image value of the accessed entry. In certain embodiments, apply agent 138 might not create the insert map prior to determining that the accessed entry contains a changed data DELETE statement. For example, apply agent 138 may not access an entry containing a changed data INSERT statement which requires creating an insert map. Accordingly, if apply agent 138 cannot perform the operations of step 410, then apply agent 138 will continue with subsequent processing as described in step 412.

In step 412, apply agent 138 inserts the key image value of the accessed entry into a delete set. In this embodiment, if a delete set has not yet been created (i.e., the accessed entry is the first processed entry that contains a changed data DELETE statement), apply agent 138 first creates the delete set. After step 412, processing repeats at step 402, where apply agent 138 accesses a next entry in the internal buffer.

If, in step 408, apply agent 138 determines that the accessed entry does not contain a changed data DELETE statement, then in step 414, apply agent 138 determines whether a specified threshold is met. For example, the specified threshold can depend on various criteria which are specified to control the manner in which changed data statements are applied from the insert map and delete set to external buffer table 136. In this embodiment, a user specifies a threshold to be a specified duration of time. In other embodiments, the specified threshold are based on other various criteria (e.g., allocated memory is full, an entry contains a commit log record, etc.).

In step 416, apply agent 138 applies changed data statements to external buffer table 136. In this embodiment, apply agent 138 uses the newly created delete set and insert map to apply changed data statements to external buffer table 136. For example, the operational steps described in step 416 can be performed at step 306 of FIG. 3 and can be performed in accordance with operational steps described in FIG. 5.

Accordingly, embodiments of the present invention can perform the operational steps described in FIG. 4 to use an insert map and delete set to apply changed data statements to external buffer table 136. Furthermore, a specified threshold can indicate how many changed data statements per chunk are applied to external buffer table 136. For example, a user may modify the specified threshold to reduce or increase the number of changed data statements per chunk that are applied to external buffer table 136. As previously discussed, the number of changed data statements per chunk applied by apply agent 138 to external buffer table 136 affects the computational overhead of target system 130 and components therein, in addition to affecting the frequency in which changed data statements are applied.

Figure 5:
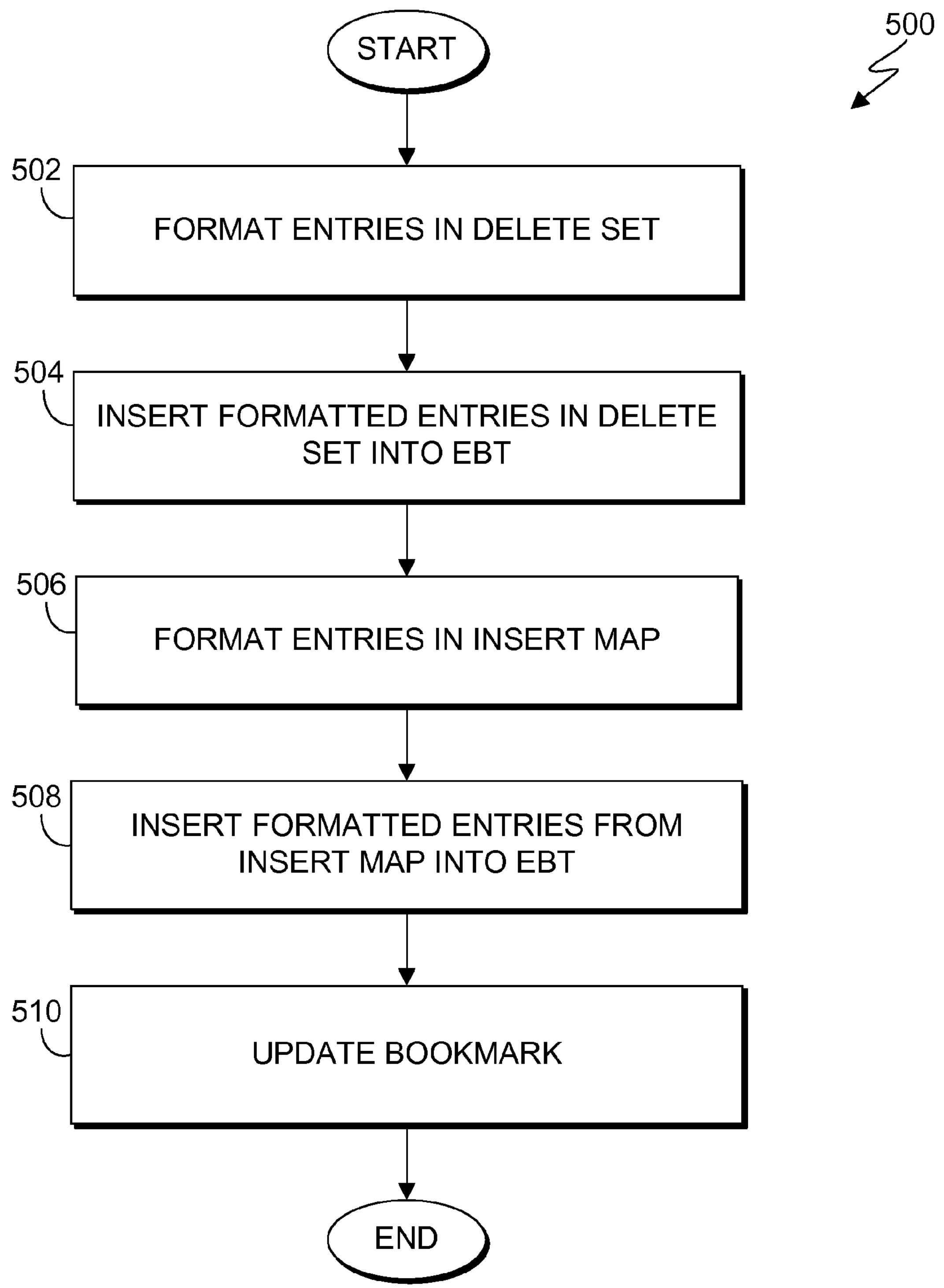
FIG. 5 is a flowchart illustrating operational steps for applying changed data statements to an external buffer table, in accordance with an embodiment of the present invention.

FIG. 5 is a flowchart 500 illustrating operational steps for applying changed data statements to external buffer table 136, in accordance with an embodiment of the present invention. In this embodiment, apply agent 138 uses the newly created insert map and the newly created delete set to apply changed data statements to external buffer table 136. As previously discussed, the operational steps described in FIG. 5 can be performed at step 416 of FIG. 4.

In step 502, apply agent 138 formats all entries in a delete set. In this embodiment, apply agent 138 formats entries in the delete set so that it comports with a format of external buffer table 136. In this embodiment, each formatted entry comprises a target table name, an operation (i.e., DELETE), and a corresponding key image value.

In step 504, apply agent 138 inserts formatted entries from the delete set into external buffer table 136. Accordingly, external buffer table 136 now contains entries for the most recent changed data DELETE statements for the referenced target tables 132 and key image values.

In step 506, apply agent 138 formats entries in an insert map. In this embodiment, apply agent 138 formats entries in the insert map set so that they comport with a format of external buffer table 136. In general, each formatted entry comprises a target table name, an operation (i.e., INSERT), a corresponding key image value, and row image values.

In step 508, apply agent 138 inserts formatted entries from the insert set into external buffer table 136. Accordingly, external buffer table 136 now also contains entries for the most recent changed data INSERT statements for target tables 132 and key image values referenced in the insert map.

In step 510, target system 130 updates bookmark table 134. In this embodiment, apply agent 138 creates an entry in bookmark table 134 to indicate that changed data statements that have been successfully applied to external buffer table 136. As previously discussed, such entries in bookmark table 134 contain information necessary to start replication or restart replication after an unexpected termination of a replication process.

Figure 6:
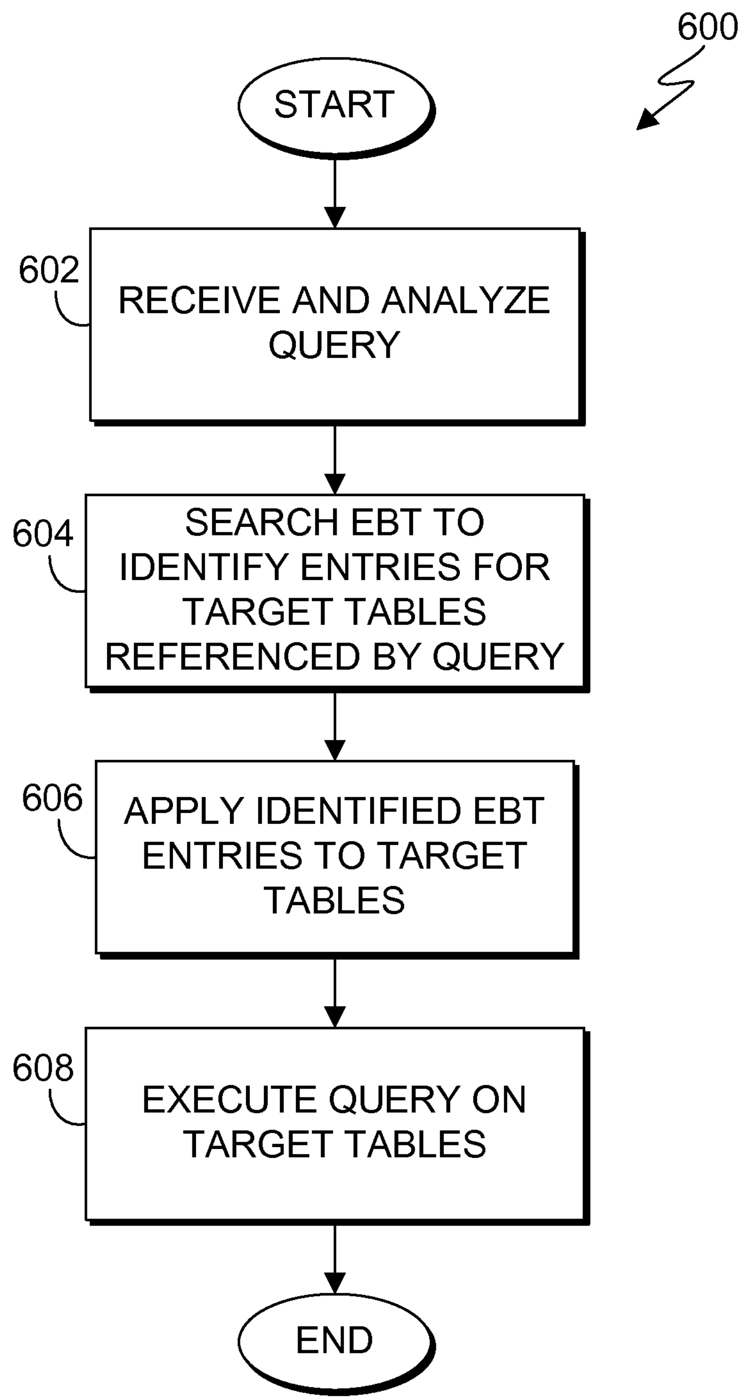
FIG. 6 is a flowchart illustrating operational steps for selectively applying changed data statements from the external buffer table to target tables based upon a received query, in accordance with an embodiment of the present invention.

FIG. 6 is a flowchart 600 illustrating operational steps for selectively applying changed data statements from external buffer table 136 to target tables 132 based upon a received query, in accordance with an embodiment of the present invention. As previously discussed, each entry in external buffer table 136 comprises changed data statements. Each entry in target tables 132 contains updated source data. Furthermore, entries of external buffer table 136 containing changed data statements indicate changes to be applied by apply agent 138 to entries in target tables 132. In this embodiment, a query processed by target database management system 133 references entries in target tables 132 and entries in external buffer table 136. In another embodiment, a query processed by target database management system 133 only references entries in target tables 132.

In step 602, target database management system 133 receives a query for information stored on target tables 132. For example, the query may involve requesting consolidated data (e.g., monthly financial reports) from a plurality of target tables 132. In this embodiment, apply agent 138 analyzes the query to identify names of target tables 132 referenced by the query.

In step 604, apply agent 138 searches external buffer table 136 to identify entries in external buffer table 136 referenced by the query. In this embodiment, apply agent 138 analyzes the query to identify entries in external buffer table 136 that contain source data changes (e.g., in the form of changed data statements) referenced by the query.

In step 606, apply agent 138 applies the identified entries from external buffer table 136 to the corresponding target tables 132. In this embodiment, for each changed data DELETE statement, apply agent 138 deletes entries from target tables 132 referenced by the query that match (i.e., have identical target table 132 name and key image values) entries referenced by the query in external buffer table 136. Subsequently, for each changed data INSERT statement, apply agent 138 inserts entries into target tables 132 referenced by the query that match entries referenced by the query in external buffer table 136. Furthermore, apply agent 138 deletes the entries that match entries of target tables 132 referenced by the query from external buffer table 136. Accordingly, apply agent 138 applies all changed data statements contained in entries referenced by the query in external buffer table 136 to target tables 132 referenced by the query, resulting in updated target tables 132. In other embodiments, apply agent 138 performs operational steps described in FIG. 7 simultaneous to, prior to, or after operational steps described in step 604.

In step 608, target database management system 133 executes the received query on target tables 132, which include any target tables 132 updated by applying source data changes from external buffer table 136. In this embodiment, target database management system 133 transmits a response to a query. Accordingly, the response to a request for information (e.g., a query) is executed using updated source data referenced by the query (i.e., the query response reflects changes in source data transmitted from source system 110 to target system 130). As previously discussed, a user can specify sizes of chunks (i.e., number of changed data statements) to be applied to target tables 132 prior to processing a query on those target tables 132. Furthermore, applying changed data statements individually may result in more updated source data that is replicated on target system 130. In this embodiment, selectively applying changed data statements in chunks, wherein each chunk contains changed data statements referenced by the query, reduces the number of changed data statements to be applied. Accordingly, a response time to receive a response from a query is reduced because target tables 132 are updated to reflect changed data statements that are only referenced by the query.

Figure 7:
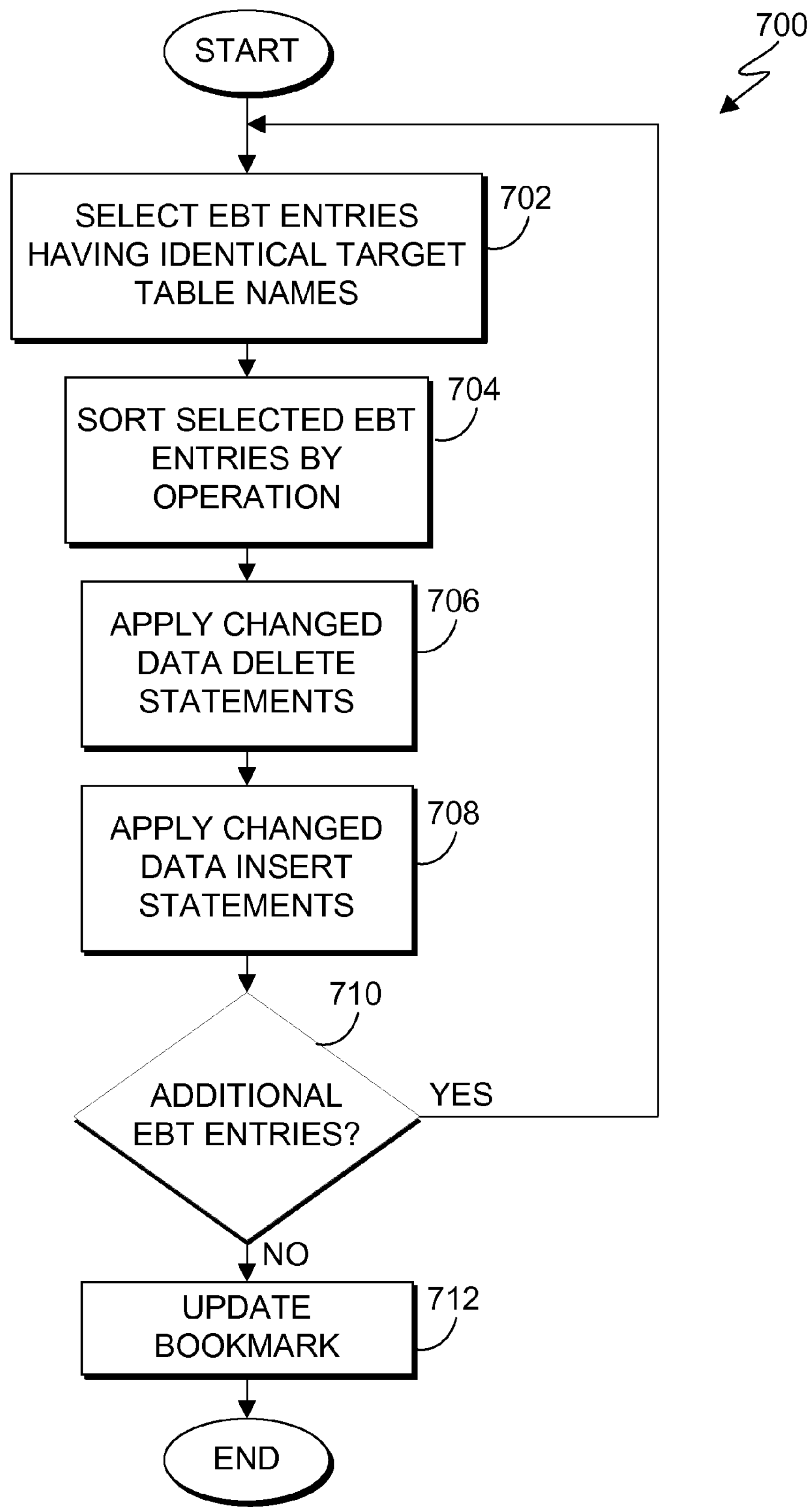
FIG. 7 is a flowchart illustrating operational steps for selectively applying changed data statements from the external buffer table to target tables based upon a received query, in accordance with another embodiment of the present invention.

FIG. 7 is a flowchart 700 illustrating operational steps for selectively applying changed data statements from external buffer table 136 to target tables 132 based upon a received query, in accordance with an embodiment of the present invention. In this embodiment, apply agent 138 selectively applies changed data statements to reduce the size of external buffer table 136. For example, a memory threshold of external buffer table 136 may reach capacity. In this instance, operational steps in FIG. 7 describe how target database management system 133 and apply agent 138 optimize the process for selectively applying source data changes. For example, the operational steps described in FIG. 7 can be performed at step 606 of FIG. 6. Accordingly, apply agent 138 uses entries referenced by a query in external buffer table 136 and target tables 132 referenced by the query, identified in FIG. 6.

In step 702, apply agent 138 selects the entries referenced by the query in external buffer table 136 that have identical names of one target table 132. For example, if entries referenced by the query in external buffer table 136 contain two names of target tables 132, then in step 702, apply agent 138 selects the entries referenced by the query in external buffer table 136 that are correlated with only one target table 132.

In step 704, apply agent 138 sorts the selected entries from external buffer table 136 and orders the selected entries by their respective operation (e.g., INSERT or DELETE). In this embodiment, apply agent 138 preserves an order of the selected entries, wherein the order reflects a sequence in which the changed data statements were applied to source tables 112. For example, apply agent 138 may associate each selected entries with an entry number that indicates an order in which they were received by apply agent 138.

In step 706, apply agent 138 selectively applies changed data DELETE statements to the respective target table 132. In this embodiment, changed data DELETE statements are applied to the respective target table 132 by performing operational steps similar to those described in step 606 of FIG. 6.

In step 708, apply agent 138 selectively applies changed data INSERT statements to the respective target tables 132. In this embodiment, changed data INSERT statements are applied to the respective target table 132 by performing operational steps similar to those described in step 606 of FIG. 6. Accordingly, the respective target table 132 that is referenced by the query is updated with source data changes made in source tables 112.

In step 710, apply agent 138 determines whether additional external buffer table 136 entries are to be selectively applied. In this embodiment, apply agent 138 determines if additional entries referenced by the query in external buffer table 136 correlate with another name of one target table 132 referenced by the query.

If, in step 710, apply agent 138 determines that no additional external buffer table 136 entries are to be selectively applied, then in step 712, apply agent 138 updates bookmark table 134 to reflect the last chunk of changed data statements that were successfully applied to the respective target table 132. In another embodiment, apply agent 138 updates bookmark table 134 after all entries referenced by the query in external buffer table 136 are successfully applied to all respective target tables 132 referenced by the query.

If, in step 710, apply agent 138 determines that additional external buffer table 136 entries are to be selectively applied, then, apply agent 138 selects the entries referenced by the query in external buffer table 136 that have identical names of another target table 132, as described in step 702.

Figure 8:
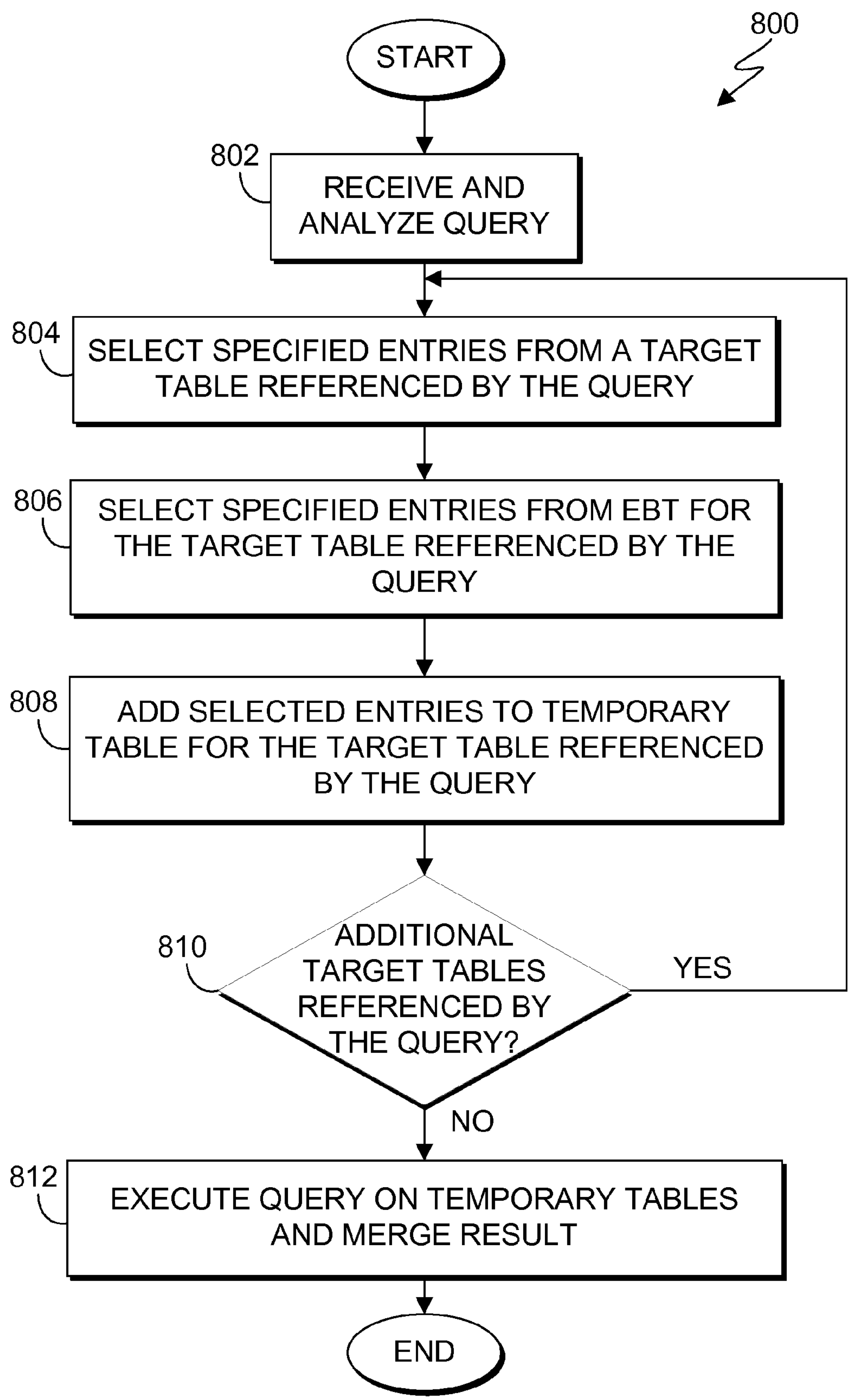
FIG. 8 is a flowchart illustrating operational steps for selectively applying changed data statements from the external buffer table to target tables, in accordance with another embodiment of the present invention.

FIG. 8 is a flowchart 800 illustrating operational steps for selectively applying changed data statements from external buffer table 136 to target tables 132, in accordance with another embodiment of the present invention. It should be understood that, entries containing updated source data in target tables 132 include key values (i.e., all source data for every column in a particular row).

In step 802, target database management system 133 receives a query. In this embodiment, the query can be received and analyzed in accordance with operational steps described in step 602 of FIG. 6. Accordingly, apply agent 138 identifies entries referenced by the query in external buffer table 136 that correspond (i.e., have matching target table names) to entries of a target table 132 referenced by the query.

In step 804, apply agent 138 selects specified entries from the target table 132. In this embodiment, apply agent 138 selects specified entries from the target table 132 referenced by the query that contain identical key image values for the target table 132, except for entries in external buffer table 136 that contain a changed data DELETE statement.

In step 806, target database management system 133 selects specified entries from external buffer table 136. In this embodiment, selects a specified entry from external buffer table 136 that contains matching content (i.e., name of target table, row image) to the corresponding target table 132 referenced by the query.

In step 808, apply agent 138 creates a temporary table to add the selected entries referenced by the query in external buffer table 136, in union with selected entries in the target table 132 referenced by the query. In another embodiment, apply agent 138 creates a view of selected entries referenced by the query in external buffer table 136 and target tables 132 instead of creating a temporary table (i.e., without copying and moving data from external buffer table 136 or target tables 132).

In step 810, apply agent 138 determines whether additional target tables 132 are referenced by the query. In this embodiment, apply agent 138 determines if additional target tables 132 referenced by analyzing the query and determining which entries in external buffer table 136 correlate with another name of one target table 132 referenced by the query.

If, in step 810, apply agent 138 determines that additional target tables 132 are referenced by the query, then, apply agent 138 continues to select specified entries from another target tables 132 referenced by the query, as described in step 804.

If, in step 810, apply agent 138 determines that no additional target tables 132 are referenced by the query, then in step 812, target database management system 133 executes the query on one or more temporary tables, wherein each temporary table corresponds to a particular target table 132 referenced by the query. In this embodiment, target database system 133 merges the response for the query for each temporary table as a result set.

Figure 9:
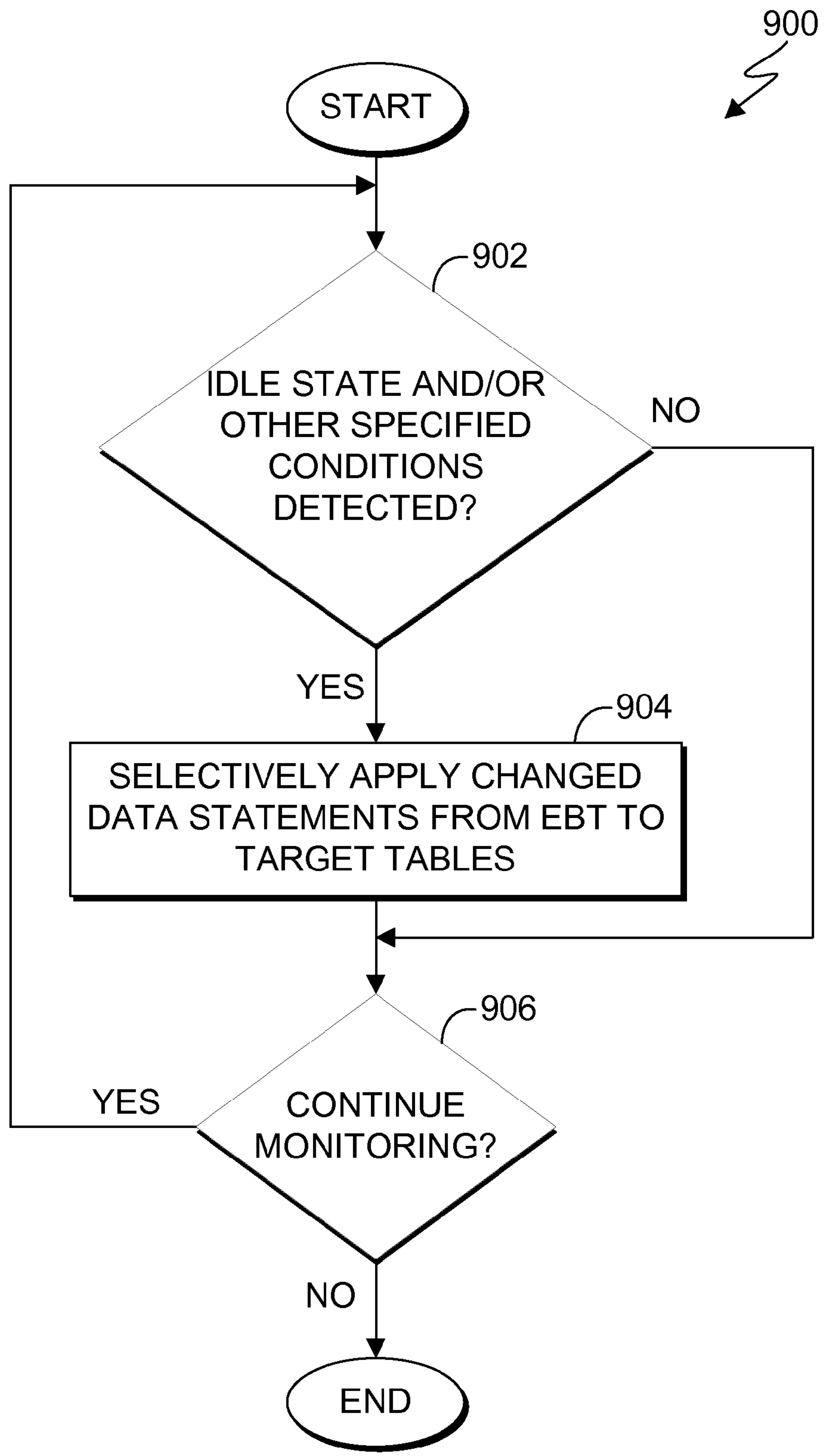
FIG. 9 is a flowchart illustrating operational steps for selectively applying changed data statements from the external buffer table to target tables, in accordance with another embodiment of the present invention.

FIG. 9 is a flowchart 900 illustrating operational steps for selectively applying changed data statements to target tables 132, in accordance with an embodiment of the present invention. For example, the operational steps described in FIG. 9 can be performed at step 606 of FIG. 6, and can also be performed at steps 706 and 708 of FIG. 7.

In step 902, apply agent 138 determines whether an idle state and/or other specified conditions are detected. In this embodiment, apply agent 138 detects an idle state if a query is not currently being processed. In this embodiment, apply agent 138 makes the determination based on whether target database management system 133 requests apply agent 138 to apply changed data statements referenced by a query. Furthermore, other conditions are specified as memory thresholds of target system 130 and components therein, duration of replicating time, automated application of changed data statements for specific times throughout the day, or any other user specified condition.

If, in step 902, apply agent 138 determines that an idle state and/or other specified conditions are detected, then in step 904, apply agent 138 selectively applies changed data statements from external buffer table 136 to respective target tables 132. In this embodiment, apply agent 138 selectively applies changed data statements in accordance with operational steps described in step 606 of FIG. 6.

If, in step 902, apply agent 138 determines that an idle state and/or other specified conditions are not detected, then in step 906, apply agent 138 determines whether to continue monitoring the state of target system 130. In this embodiment, apply agent 138 makes this determination to continue monitoring the state of target system 130 based on varying criteria (e.g., a manual specification, pre-defined specification, etc.). For example, a user specification may indicate to continually monitor the state of target system 130 for a specified duration of time.

If, in step 906, apply agent 138 determines to continue monitoring the state of target system 130, then in step 902, apply agent 138 determines whether an idle state and/or other specified conditions are detected.

If, in step 906, apply agent 138 determines to not continue monitoring the state of target system 130, then operational steps described in FIG. 9 to are terminated.

FIG. 10 provides an example of a visual representation of an internal buffer of capture agent 114, in accordance with an embodiment of the present invention. It should be understood, that the internal buffer can contain information regarding names of target tables 132 and corresponding source data changes. In this embodiment, source data changes are represented by changed data statements.

FIGS. 11A and 11B provide examples of a newly created delete set and a formatted delete set, in accordance with an embodiment of the present invention. In this embodiment, apply agent 138 creates a delete set (FIG. 11A) by performing operational steps described in FIG. 4. Furthermore, apply agent 138 formats the newly created delete set, resulting in a formatted delete set (FIG. 11B), by performing operational steps described in FIG. 5. In this instance, apply agent 138 uses TY to denote a changed data DELETE statement.

FIGS. 12A and 12B provide examples of a newly created insert map and a formatted insert map, in accordance with an embodiment of the present invention. In this embodiment, apply agent 138 creates an insert map (FIG. 12A) by performing operational steps described in FIG. 4. Furthermore, apply agent 138 formats the newly created insert map, resulting in a formatted insert map (FIG. 12B), by performing operational steps described in FIG. 5. In this instance, apply agent 138 uses 'I' to denote a changed data INSERT statement.

Operational steps mentioned in FIG. 4 can be illustrated by the following example. FIG. 10 shows a value of a key image and concatenated values for a row image for each respective operation and names of target tables 132. As described in step 402, apply agent 138 receives a first entry of the internal buffer. In this instance, the first entry of the internal buffer contains a changed data DELETE statement. As described in step 404, apply agent 138 does not determine that the first entry contains a changed data INSERT statement. Subsequently, in step 408, apply agent 138 determines that the first entry contains a changed data DELETE statement. Accordingly, in step 410, apply agent 138 deletes a key image value from an insert map. In this instance, apply agent 138 did not create an insert map prior to analyzing the first entry, so apply agent 138 continues with subsequent processing without deleting a key image value from an insert map. In step 412, apply agent 138 inserts the key image value into a delete set. In this instance, apply agent 138 did not create delete set prior to analyzing the first entry, so apply agent 138 creates a delete set and then inserts the key image value into the delete set (FIG. 11A). Subsequently, apply agent 138 receives a second entry of the internal buffer. In this instance, the second entry of the internal buffer contains a changed data INSERT statement. As described in step 404, apply agent 138 determines that the second entry contains a changed data INSERT statement. Accordingly, as described in step 406, apply agent 138 creates an insert map (since the second entry is the first entry to contain a changed data INSERT statement) and inserts a row image and a key image value into the insert map (FIG. 12A). Subsequently, apply agent 138 receives a third entry and processes the third entry using operational steps discussed in FIG. 4, resulting in an additional entry of the delete set. Then, apply agent 138 receives a fourth entry and processes the fourth entry using operational steps discussed in FIG. 4, resulting in additional entry of the insert set. Lastly, apply agent receives a fifth entry and processes the fifth entry using operational steps discussed in FIG. 4. In this embodiment, the fifth entry contains a changed data INSERT statement that does not a have a preceding changed data DELETE statement, and in certain embodiments of step 414, apply agent 138 determines that the threshold is met. Accordingly, as described in step 416, apply agent 138 applies all changed data statements in the newly created insert map (FIG. 12A) and the newly created delete set (FIG. 11A) to external buffer table 136.

FIGS. 13A and 13B provide examples of external buffer table 136 prior to applying changed data statements and external buffer table 136 subsequent to applying changed data statements, in accordance with an embodiment of the present invention. In this embodiment, apply agent 138 uses external buffer table 136 (FIG. 13A), formatted delete set (FIG. 11B), and formatted insert map (FIG. 12B) to perform operational steps described in FIG. 5, resulting in external buffer table 136 (FIG. 13B).

Figure 14:
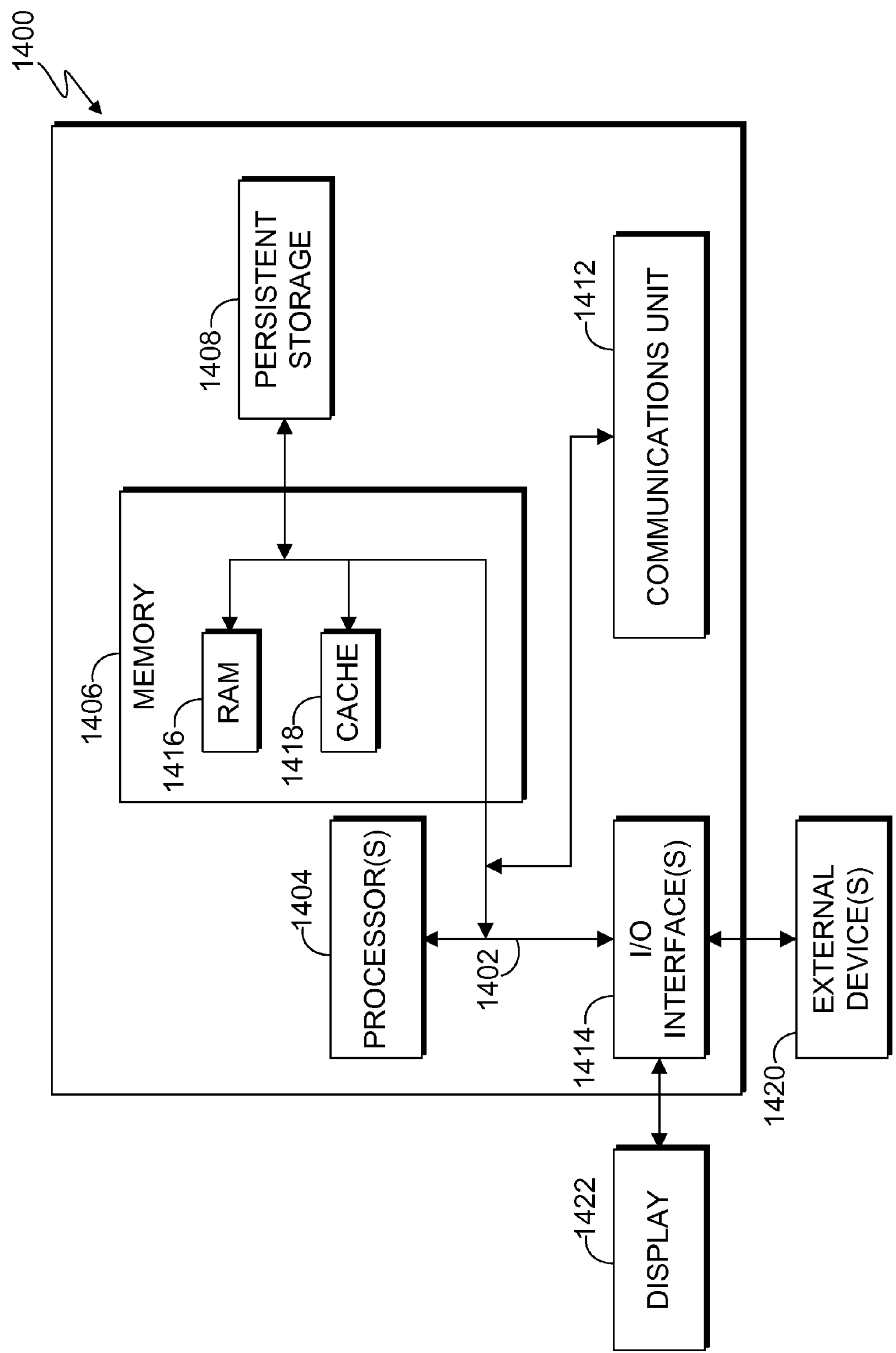
FIG. 14 is a block diagram of internal and external components of a computer system 1400, in accordance with an embodiment of the present invention.

FIG. 14 is a block diagram of internal and external components of a computer system 1400, which is representative of the computer systems of FIG. 1, in accordance with an embodiment of the present invention. It should be appreciated that FIG. 14 provides only an illustration of one implementation and does not imply any limitations with regard to the environments in which different embodiments may be implemented. In general, the components illustrated in FIG. 14 are representative of any electronic device capable of executing machine-readable program instructions. Examples of computer systems, environments, and/or configurations that may be represented by the components illustrated in FIG. 14 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 1400 includes communications fabric 1402, which provides for communications between one or more processors 1404, memory 1406, persistent storage 1408, communications unit 1412, and one or more input/output (I/O) interfaces 1414. Communications fabric 1402 can be implemented with any architecture designed for passing data and/or control information between processors (such as microprocessors, communications and network processors, etc.), system memory, peripheral devices, and any other hardware components within a system. For example, communications fabric 1402 can be implemented with one or more buses.

Memory 1406 and persistent storage 1408 are computer-readable storage media. In this embodiment, memory 1406 includes random access memory (RAM) 1416 and cache memory 1418. In general, memory 1406 can include any suitable volatile or non-volatile computer-readable storage media. Software is stored in persistent storage 1408 for execution and/or access by one or more of the respective processors 1404 via one or more memories of memory 1406.

Persistent storage 1408 may include, for example, a plurality of magnetic hard disk drives. Alternatively, or in addition to magnetic hard disk drives, persistent storage 1408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 1408 can also be removable. For example, a removable hard drive can be used for persistent storage 1408. Other examples include optical and magnetic disks, thumb drives, and smart cards that are inserted into a drive for transfer onto another computer-readable storage medium that is also part of persistent storage 1408.

Communications unit 1412 provides for communications with other computer systems or devices via a network (e.g., network 120). In this exemplary embodiment, communications unit 1412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 1412 (e.g., via the Internet, a local area network or other wide area network). From communications unit 1412, the software and data can be loaded onto persistent storage 1408.

One or more I/O interfaces 1414 allow for input and output of data with other devices that may be connected to computer system 1400. For example, I/O interface 1414 can provide a connection to one or more external devices 1420 such as a keyboard, computer mouse, touch screen, virtual keyboard, touch pad, pointing device, or other human interface devices. External devices 1420 can also include portable computer-readable storage media such as, for example, thumb drives, portable optical or magnetic disks, and memory cards. I/O interface 1414 also connects to display 1422.

Display 1422 provides a mechanism to display data to a user and can be, for example, a computer monitor. Display 1422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for asynchronously replicating data, the method comprising:

accessing, by a target computer, one or more statements in an internal buffer table of a capture agent of a source computer, wherein the capture agent is configured to monitor, process, and transmit data changes on one or more source tables of the source computer to the target computer via a network;

responsive to identifying an insert statement in an accessed entry of the internal buffer table, inserting, by the capture agent, a row image and a key image value into an insert map;

responsive to determining, by the capture agent, that the accessed entry does not contain the insert statement, identifying a delete statement;

responsive to the identifying the delete statement, deleting, by the capture agent, preceding entries from the insert map that have a same named target table and key image value of the accessed entry and inserting the key image value into a delete set;

responsive to determining, by the capture agent, that the accessed entry does not contain the delete statement, determining, by the capture agent, whether a specified threshold is met;

receiving, by the target computer, from the source computer, the one or more statements that describe the data changes on the one or more source tables of the source computer to be replicated on one or more target tables of the target computer;

responsive to determining that the specified threshold is met, applying, by the target computer, the one or more statements to an external buffer table of the target computer;

selectively applying, by the target computer, the one or more statements from the external buffer table to the one or more target tables to replicate the data changes on the one or more target tables, wherein the applying the one or more statements comprises:

creating, by the target computer, another insert map including entries for insert statements, wherein each entry in the other insert map references the one or more target tables, data values to be inserted into a row of the named target table, and a row identifier for the row which the data values are to be inserted;

responsive to receiving, at the target computer, a query referencing the one or more target tables, applying the one or more statements corresponding to the referenced one or more target tables from the external buffer table to the one or more referenced target tables; and creating, by the target computer, a view of the one or more statements referenced by the query to execute the query.

2. The method of claim 1, wherein each statement of the one or more statements comprises: a named target table, an insert operation or a delete operation to be performed on the named target table, and a description of data to be added to or deleted from the named target table.

3. The method of claim 1, wherein applying, by the target computer, the one or more statements to an external buffer table of the target computer, comprises:

selecting, by the target computer, from an internal buffer, all statements that have an insert operation except statements having a named target table and row identifier that match those referenced by a subsequent statement in the internal buffer having a delete operation;

selecting, by the target computer, from an internal buffer, all statements that have a delete operation;

applying, by the target computer, the selected statements having a delete operation to the external buffer table; and applying, by the target computer, the selected statements having an insert operation to the external buffer table, wherein the selected statements having a delete operation are applied to the external buffer table prior to applying the selected statements having an insert operation to the external buffer table.

4. The method of claim 1, wherein applying, by the target computer, the one or more statements to an external buffer table of the target computer, comprises:

creating, by the target computer, a delete set comprising entries for all statements that have a delete operation, wherein each entry in the delete set references a named target table and a row identifier for a row in the named target table;

deleting from the insert map all statements that chronologically precede an entry of the delete set having a matching named target table and row identifier;

inserting all entries from the delete set into the external buffer table; and inserting all entries from the insert map into the external buffer table.

5. The method of claim 4, further comprising:

formatting entries in the delete set and insert map to comport with a format used by the external buffer table.

6. The method of claim 1, wherein applying, by the target computer, statements corresponding to the referenced one or more target tables from the external buffer table to the one or more referenced target tables, comprises:

replicating, by the target computer, data changes described by the applied statements on the one or more referenced target tables; and deleting from the external buffer table the applied statements.

7. The method of claim 1, wherein selectively applying, by the target computer, the one or more statements from the external buffer table to the one or more target tables to replicate the data changes on the one or more target tables, comprises:

responsive to receiving, at the target computer, the query referencing one or more target tables, selecting, by the target computer, statements in the external buffer table that correspond to the referenced one or more target tables and have an insert operation; and selecting, by the target computer, entries in the one or more target tables that correspond to the referenced one or more target tables, except entries having a named target table and row identifier that match a named target table and row identifier of a statement in the external buffer table having a delete operation.

8. The method of claim 1, wherein selectively applying, by the target computer, the one or more statements from the external buffer table to the one or more target tables to replicate the data changes on the one or more target tables, comprises:

responsive to detecting an idle state of the target computer, applying, by the target system, statements from the external buffer table to one or more target tables.

9. The method of claim 1, wherein selectively applying, by the target computer, the one or more statements from the external buffer table to the one or more target tables to replicate the data changes on the one or more target tables, comprises:

responsive to detecting that a size of the external buffer table has exceeded a specified threshold, applying, by the target computer, statements from the external buffer table to one or more target tables.

10. The method of claim 1, wherein the source computer is an online transaction processing (OLTP) system, and the target computer is an online analytical processing (OLAP) system.

* * * * *